United States Patent
Gupta et al.

(10) Patent No.: US 8,897,814 B2
(45) Date of Patent: *Nov. 25, 2014

(54) METHOD AND APPARATUS FOR TRANSMITTING INDOOR CONTEXT INFORMATION

(71) Applicant: QUALCOMM Incorporated, San Diego, CA (US)

(72) Inventors: Rajarshi Gupta, Sunnyvale, CA (US); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,165

(22) Filed: Aug. 2, 2013

(65) Prior Publication Data

US 2013/0316742 A1    Nov. 28, 2013

Related U.S. Application Data

(63) Continuation of application No. 12/901,230, filed on Oct. 8, 2010.

(60) Provisional application No. 61/250,867, filed on Oct. 12, 2009, provisional application No. 61/251,033, filed on Oct. 13, 2009.

(51) Int. Cl.
| | |
|---|---|
| H04W 24/00 | (2009.01) |
| H04W 4/04 | (2009.01) |
| G01S 5/00 | (2006.01) |
| G01C 15/00 | (2006.01) |
| H04W 4/02 | (2009.01) |
| H04W 4/20 | (2009.01) |
| H04L 29/08 | (2006.01) |
| H04W 64/00 | (2009.01) |

(52) U.S. Cl.
CPC ............. *H04W 4/043* (2013.01); *G01S 5/0045* (2013.01); *G01S 5/0036* (2013.01); *G01C 15/00* (2013.01); *H04W 4/02* (2013.01); *H04W 4/20* (2013.01); *H04L 67/18* (2013.01); *H04W 64/00* (2013.01)
USPC ............... 455/456.5; 455/444; 455/422.1; 455/41.2; 455/449; 370/328

(58) Field of Classification Search
USPC ................................ 455/456.1–456.6
See application file for complete search history.

(56) References Cited

U.S. PATENT DOCUMENTS

| | | | |
|---|---|---|---|
| 6,047,234 | A | 4/2000 | Cherveny et al. |
| 6,259,405 | B1 | 7/2001 | Stewart et al. |

(Continued)

FOREIGN PATENT DOCUMENTS

| | | |
|---|---|---|
| CN | 1530635 A | 9/2004 |
| CN | 101147407 A | 3/2008 |

(Continued)

OTHER PUBLICATIONS

Xiaoqin et al., "The Control of Navigation Along a Wall for a Mobile Robot Based on Infrared PSD," (Wall-following Navigation Control for Infra PSD-based Mobile Robot) Machine Tool & Hydraulics, Sep. 30, 2009, vol. 37, No. 9, pp. 133-136.

(Continued)

*Primary Examiner* — Vladimir Magloire
(74) *Attorney, Agent, or Firm* — Arnold J. Gum (57) ABSTRACT

The subject matter disclosed herein relates to a system and method for determining indoor context information relating to a location of a mobile device. Indoor context information may be utilized by a mobile device or a network element to obtain an estimate of a location of the mobile device within an indoor environment.

36 Claims, 6 Drawing Sheets

(56) References Cited

U.S. PATENT DOCUMENTS

| | | |
|---|---|---|
| 6,295,502 B1 | 9/2001 | Hancock et al. |
| 6,490,460 B1 | 12/2002 | Soliman |
| 6,529,164 B1 | 3/2003 | Carter |
| 6,859,727 B2 | 2/2005 | Bye et al. |
| 7,035,650 B1 | 4/2006 | Moskowitz et al. |
| 7,466,986 B2 | 12/2008 | Halcrow et al. |
| 7,480,513 B2 | 1/2009 | Woo |
| 7,647,055 B2 | 1/2010 | Gum et al. |
| 7,761,233 B2 | 7/2010 | Schott et al. |
| 7,912,633 B1 | 3/2011 | Dietsch et al. |
| 8,068,056 B2 | 11/2011 | Wachter et al. |
| 8,340,901 B2 | 12/2012 | Fahn et al. |
| 8,344,949 B2 | 1/2013 | Moshfeghi |
| 2001/0037305 A1 | 11/2001 | Mochizuki |
| 2003/0008661 A1 | 1/2003 | Joyce et al. |
| 2004/0015325 A1 | 1/2004 | Hirano et al. |
| 2004/0061646 A1 | 4/2004 | Andrews et al. |
| 2004/0117753 A1 | 6/2004 | Kahng et al. |
| 2004/0139049 A1 | 7/2004 | Hancock et al. |
| 2004/0181335 A1 | 9/2004 | Kim et al. |
| 2004/0193365 A1 | 9/2004 | Kokojima et al. |
| 2004/0193707 A1 | 9/2004 | Alam et al. |
| 2006/0149465 A1 | 7/2006 | Park et al. |
| 2006/0217881 A1 | 9/2006 | Pei et al. |
| 2006/0245406 A1 | 11/2006 | Shim |
| 2006/0287813 A1 | 12/2006 | Quigley |
| 2007/0143016 A1 | 6/2007 | Kung et al. |
| 2007/0184845 A1 | 8/2007 | Troncoso |
| 2007/0293239 A1 | 12/2007 | Dawson et al. |
| 2008/0082225 A1 | 4/2008 | Barrett |
| 2008/0102857 A1 | 5/2008 | Kim |
| 2008/0280624 A1 | 11/2008 | Wrappe |
| 2009/0019095 A1 | 1/2009 | Asahara et al. |
| 2009/0043502 A1 | 2/2009 | Shaffer et al. |
| 2009/0043504 A1 | 2/2009 | Bandyopadhyay et al. |
| 2009/0119010 A1 | 5/2009 | Moravec |
| 2009/0157294 A1 | 6/2009 | Geelen et al. |
| 2009/0163228 A1 | 6/2009 | Blumberg et al. |
| 2009/0216438 A1 | 8/2009 | Shafer |
| 2009/0238417 A1 | 9/2009 | Nielsen et al. |
| 2009/0251366 A1 | 10/2009 | Mcclure et al. |
| 2010/0008337 A1 | 1/2010 | Bajko |
| 2010/0023250 A1 | 1/2010 | Mays et al. |
| 2010/0023252 A1 | 1/2010 | Mays et al. |
| 2010/0125409 A1 | 5/2010 | Prehofer |
| 2010/0259450 A1 | 10/2010 | Kainulainen et al. |
| 2010/0299065 A1 | 11/2010 | Mays |
| 2010/0305851 A1 | 12/2010 | Meyer et al. |
| 2011/0015860 A1 | 1/2011 | Nesbitt |
| 2011/0080848 A1 | 4/2011 | Khorashadi et al. |
| 2011/0081918 A1 | 4/2011 | Burdo et al. |
| 2011/0081919 A1 | 4/2011 | Das et al. |
| 2011/0082638 A1 | 4/2011 | Khorashadi et al. |
| 2011/0086646 A1 | 4/2011 | Gupta et al. |
| 2011/0172916 A1 | 7/2011 | Pakzad et al. |
| 2011/0178705 A1 | 7/2011 | Pakzad et al. |
| 2012/0007779 A1 | 1/2012 | Klepal et al. |
| 2012/0029817 A1 | 2/2012 | Khorashadi et al. |
| 2012/0044265 A1 | 2/2012 | Khorashadi et al. |
| 2012/0130632 A1 | 5/2012 | Bandyopadhyay et al. |
| 2012/0203453 A1 | 8/2012 | Lundquist et al. |
| 2013/0317778 A1 | 11/2013 | Gupta et al. |
| 2013/0345967 A1 | 12/2013 | Pakzad |
| 2014/0066103 A1 | 3/2014 | Das et al. |

FOREIGN PATENT DOCUMENTS

| | | |
|---|---|---|
| CN | 101275854 A | 10/2008 |
| CN | 101427105 A | 5/2009 |
| CN | 101487714 A | 7/2009 |
| CN | 101576384 A | 11/2009 |
| DE | 102007045082 A1 | 4/2009 |
| EA | 009927 B1 | 4/2008 |
| EP | 0921509 A2 | 6/1999 |
| EP | 1708152 A2 | 10/2006 |
| EP | 2148167 A2 | 1/2010 |
| GB | 2355793 A | 5/2001 |
| JP | H11249552 A | 9/1999 |
| JP | 2000111648 A | 4/2000 |
| JP | 2002221422 A | 8/2002 |
| JP | 2003240591 A | 8/2003 |
| JP | 2004150827 A | 5/2004 |
| JP | 2006130131 A | 5/2006 |
| JP | 2006267057 A | 10/2006 |
| JP | 2006267114 A | 10/2006 |
| JP | 2007333998 A | 12/2007 |
| JP | 2008083112 A | 4/2008 |
| JP | 2009123105 A | 6/2009 |
| JP | 2010539547 A | 12/2010 |
| KR | 20070056673 A | 6/2007 |
| KR | 20080092781 A | 10/2008 |
| RU | 2358282 C2 | 6/2009 |
| TW | I230909 B | 4/2005 |
| TW | I240085 B | 9/2005 |
| TW | 200821550 A | 5/2008 |
| WO | WO-2005027553 A1 | 3/2005 |
| WO | 2005106523 A1 | 11/2005 |
| WO | WO-2005106503 A1 | 11/2005 |
| WO | WO-2007025143 A1 | 3/2007 |
| WO | WO-2007056738 A2 | 5/2007 |
| WO | WO-2009040063 A1 | 4/2009 |
| WO | 2009056150 A1 | 5/2009 |

OTHER PUBLICATIONS

Beal J.R. Jr., et al., "Contextual Geolocation: A Specialized Application for Improving Indoor Location Awareness in Wireless Local Area Networks," College of Graduate Studies and Research, Minnesota State University, Mankato, MN, 2003, 17 pages.

Ceranka S. et al., "Application of particle filtering in navigation system for blind", ISSPA 2003, Seventh International Symposium on Signal Processing and Its Applications, Proceedings (CAT.No. 03EX714), vol. 2, 2003, pp. 495-498, XP002632287.

Chaer W.S., et al., "A mixture-of-experts framework for adaptive Kalman filtering", IEEE Transactions on Systems, Man and Cybernetics, Part B (Cybernetics), vol. 27, No. 3, Jun. 1997, pp. 452-464, XP002632376, IEEE USA ISSN: 1083-4419, DOI: 10.1109/3477. 584952.

Chittaro L., et al., "Presenting Evacuation Instructions on Mobile Devices by means of Location-Aware 3D Virtual Environments", MobileHCI 2008, Sep. 2-5, 2008, Amsterdam, the Netherlands, pp. 395-398.

Evennou F., et al., "Map-aided indoor mobile positioning system using particlefilter", IEEE Wireless Communications and Networking Conference (IEEE CAT. No. 05TH8794), vol. 4, May 2, 2005, pp. 2490-2494, XP002632286, IEEE Piscataway, NJ, USA.

International Search Report and Written Opinion—PCT/US2010/052384, ISA/EPO—Feb. 14, 2011.

Kandepu R., et al., "Constrained state estimation using the Unscented Kalman Filter", Control and Automation, 2008 16th Mediterranean Conference on, IEEE, Piscataway, NJ, USA, Jun. 25, 2008, pp. 1453-1458, XP031308449, ISBN: 978-1-4244-2504-4.

Li X., et al., "A Continuous-based Model for the Analysis of Indoor Spaces", Spatial and Temporal Reasoning for Ambient Intelligence Systems, COSIT 2009 Workshop Proceedings, Aug. 2009, Edited by Mehul Bhatt and Hans Guesgen, pp. 44-53.

Li X., et al., "Assisting video surveillance in micro-spatial environments with a GIS approach", Geoinformatics 2007 Geospatial Information Technology and Applications, SPIE vol. 6754 (2007), pp. 675402-1 to 675402-8.

Lorenz B., et al., "A Hybrid Spatial Model for Representing Indoor Environments", W2GIS 2006, LNCS 4295 pp. 102-112.

Lyardet F., et al., "CoINS: Context Sensitive Indoor Navigation System", Multimedia, 2006. ISM'06. Eighth IEEE International Symposium on, IEEE, PI, Dec. 1, 2006, pp. 209-218, XP031041784, ISBN: 978-0-7695-2746-8 p. 1, right-hand column p. 2, right-hand column—p. 6, left-hand column.

Martire, et al., "Location based service architecture for simple mobile services", Information Society Technologies, Version 1.1, Aug. 2008.

(56) References Cited

OTHER PUBLICATIONS

Meneses F., et al., "Enhancing the Location-Context Through Inference Over Positioning Data", Department of Information Systems, University of Minho, Portugal, 2006, pp. 40-49.

Min K., et al., "The Mobile Spatial DBMS for the Partial Map Air Update in the Navigation", Proceedings of the 11th International IEEE Conference on Intelligent Transportation Systems, Oct. 12-15, 2008, pp. 476-481.

Nomoto K., et al., "An adaptive tracking filter controlling sampling frequency phased array radar", ICASSP 86 Proceedings. IEEE-IECEJ-ASJ International Conference on Acoustics, Speech and Signal Processing (CAT. No. 86CH2243-4), 1986, pp. 2571-2574, XP002632375, IEEE New York, NY, USA.

OMA (Open Mobile Alliance Ltd.), "Secure User Plan Location Architecture", Draft Version 3.0—Feb. 10, 2010, pp. 1-41.

Orville R.E., "Development of the National Lightning Detection Network," BAMS, Feb. 2008, 11 pages.

Paul A.S., et al., "Wi-Fi based indoor localization and tracking using sigma-point Kalman filtering methods", Position, Location and Navigation Symposium, 2008 IEEE/ ION, IEEE, Piscataway, NJ, USA, May 5, 2008, pp. 646-659, XP031288927, ISBN: 978-1-4244-1536-6.

Sherwani, Lecture notes: "Global Routing", Algorithms for VLSI Physical Design Automation, 1992, pp. 6.1-6.40.

Soltani A. R., et al., "A fuzzy based multi-objective path planning of construction sites", Automation in Construction, Elsevier Science Publishers, Amsterdam, NL, vol. 13, No. 6, Nov. 1, 2004, pp. 717-734, XP004543997, ISSN: 0926-5805, DOI: DOI:10.1016/J.Autcon.2004.04.012 p. 719, left-hand column, paragraph 2 p. 720-p. 721 p. 723, right-hand column p. 725, right-hand column—p. 727 figures 1-3,5,7,10,14.

Whiting E.J., "Geometric, Topological & Semantic Analysis of Multi-Building Floor Plan Data", Jun. 2006, Thesis for Master of Science in Architecture Studies at Massachusetts Institute of Technology, pp. 1-74.

Yanco H.A., "Wheelesley: A Robotic Wheelchair System: Indoor Navigation and User Interface", Assistive Technology and AI, LNAO 1458, V.O. Mittal et al (Eds), 1998, pp. 256-268.

Zha H., et al., "Detecting changes in a dynamic environment for updating its maps by using a mobile robot", Intelligent Robots and Systems, 1997, IROS 97, Proceedings of the 19 97 IEEE/RSJ International Conference on Grenoble, France Sep. 7-11, 1997, New York, NY, USA, IEEE, US, vol. 3, Sep. 7, 1997, pp. 1729-1734, XP010264873, DOI: 10.1109/IROS.1997.656593, ISBN: 978-0-7803-4119-7.

METHOD AND APPARATUS FOR TRANSMITTING INDOOR CONTEXT INFORMATION

CLAIM OF PRIORITY UNDER 35 U.S.C. §119 AND §120

This application is a continuation of U.S. application Ser. No. 12/901,230, filed on Oct. 8, 2010 entitled "Method and Apparatus for Transmitting Indoor Context Information," which claims the benefit of and priority to U.S. Provisional Application Ser. No. 61/250,867, filed Oct. 12, 2009 and entitled "Delivery of Location Specific Indoor Context Information in SUPL," and U.S. Provisional Application Ser. No. 61/251,033, filed Oct. 13, 2009 and entitled "Delivery of Location Specific Indoor Context Information in SUPL," all of which are assigned to the assignee hereof and which are incorporated herein by reference.

BACKGROUND

1. Field

The subject matter disclosed herein relates to transmission of indoor context information to a mobile device.

2. Information

The Secure User Plane Location (SUPL) specifications produced by the Open Mobile Alliance (OMA) enable a client application, e.g., a SUPL Agent, to obtain a geographic location of a wireless terminal, e.g., a SUPL Enabled Terminal (SET). SUPL specifications also enable a SET to obtain its own location and the locations of other SETs and to transfer its location to a selected SUPL Agent.

SUPL-compliant systems may enable a SET to determine or otherwise obtain its location within an outdoor environment. For example, a SET may receive navigation signals from a satellite positioning system (SPS), and may triangulate its location or position if navigation signals from three or more satellites are received. In some indoor environments, however, navigation signals may not be available to allow a SET to triangulate its location or position.

BRIEF DESCRIPTION OF THE FIGURES

Non-limiting and non-exhaustive features will be described with reference to the following figures, wherein like reference numerals refer to like parts throughout the various figures.

SUMMARY

An aspect may reside in a method, comprising: determining information relating to a location of a mobile device based at least in part on one or more signals received by the mobile device; transmitting, by the mobile device, the information relating to the location of the mobile device to one or more network elements; receiving from the one or more network elements, by the mobile device, information relating to indoor context information for an indoor environment based at least in part on the information relating to the location of the mobile device; and obtaining an estimate of the location of the mobile device based at least in part on the information relating to the location of the mobile device and the information relating to indoor context information.

Another aspect may reside in an apparatus, comprising: a receiver to receive one or more first wireless signals; a transmitter to transmit one or more second wireless signals; a processor to: determine information relating to a location of the apparatus based at least in part on the one or more first wireless signals; initiate transmission of the information relating to the location of a mobile device to one or more network elements; process information relating to indoor context information for an indoor environment received from the one or more network elements, wherein the information relating to indoor context information is based at least in part on the information relating to the location of the apparatus; and obtain an estimate of the location of the apparatus based at least in part on the information relating to the location of the apparatus and the information relating to indoor context information.

Another aspect may reside in an apparatus, comprising: means for determining information relating to a location of the apparatus based at least in part on one or more signals received by the apparatus; means for transmitting, by the apparatus, the information relating to the location of the apparatus to one or more network elements; means for receiving from the one or more network elements, by the apparatus, information relating to indoor context information for an indoor environment based at least in part on the information relating to the location of the apparatus; and means for obtaining an estimate of the location of the apparatus based at least in part on the information relating to the location of the apparatus and the information relating to indoor context information.

Another aspect may reside in an article, comprising: a storage medium comprising machine-readable instructions executable by a special purpose apparatus to: determine information relating to a location of a mobile device based at least in part on one or more signals received by the mobile device; initiate transmission, by the mobile device, of the information relating to the location of the mobile device to one or more network elements; process information relating to indoor context information for an indoor environment received from the one or more network elements, wherein the information relating to indoor context information is based at least in part on the information relating to the location of the mobile device; and obtain an estimate of the location of the mobile device based at least in part on the information relating to the location of the mobile device and the information relating to indoor context information.

Another aspect may reside in a method, comprising: receiving, by a network element, a signal transmitted by a mobile device, the signal comprising information relating to a location of the mobile device within an indoor environment; determining, by the network element, information relating to indoor context information for an indoor environment based at least in part on the information relating to the location of the mobile device; estimating the location of the mobile device based at least in part on the information relating to the location of the mobile device and the information relating to indoor context information; and performing one or more location-based services based at least in part on the location of the mobile device.

Another aspect may reside in an apparatus, comprising: a transceiver to receive one or more signals; a processor to: determine information relating to a location of a mobile device located within an indoor environment based at least in part on the one or more signals; determine information relating to indoor context information for an indoor environment based at least in part on the information relating to the location of the mobile device; estimate the location of the mobile device based at least in part on the information relating to the location of the mobile device and the information relating to indoor context information; and perform one or more location-based services based at least in part on the location of the mobile device.

Another aspect may reside in an apparatus, comprising: means for receiving one or more signals; means for processing information received from a mobile device and relating to a location of the mobile device within an indoor environment; means for determining, by the apparatus, information relating to indoor context information for an indoor environment based at least in part on the information relating to the location of the mobile device; estimating the location of the mobile device based at least in part on the information relating to the location of the mobile device and the information relating to indoor context information; and means for performing one or more location-based services based at least in part on the location of the mobile device.

Another aspect may reside in an article, comprising: a storage medium comprising machine-readable instructions executable by a special purpose apparatus to: process a signal from a mobile device, the signal comprising information relating to a location of the mobile device within an indoor environment; determine, by a network element, information relating to indoor context information for an indoor environment based at least in part on the information relating to the location of the mobile device; estimate the location of the mobile device based at least in part on the information relating to the location of the mobile device and the information relating to indoor context information; and perform one or more location-based services based at least in part on the location of the mobile device.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

In one or more implementations, a system may be implemented, for example, to locate one or more mobile devices within a certain area. In one or more implementations, a mobile device may implement the SUPL protocol. As used herein, a "SET" may refer to a mobile device implementing the SUPL protocol. A Home SUPL Location Platform (H-SLP) may comprise a server or other device capable of locating a number of SETs within a certain area.

A SUPL Agent may request a location of a SET. In one or more implementations, a SUPL Agent may reside on a SET itself and/or may reside on a network. An example of a SUPL Agent residing on a SET is an application program which an individual may utilize to post his or her current location. For example, an individual's SET may execute an application program that allows various individuals connected through a network, such as the Internet, to post updates such as their respective current locations. If a SUPL Agent resides on a SET, the SUPL Agent may generate a location request and transmit the location request to an internal Application Programming Interface (API) of the SET. An API on a SET may translate a location request to initiate a SUPL session to estimate its location. If a location of a SET is estimated via a SUPL session, the location estimate may be translated by an API and transmitted back to a SUPL Agent on the SET that requested the location estimate.

SETs may be located so that location-based services may be performed or otherwise implemented. For example, children, elderly, or disabled people may carry SETs and their locations may be located as an emergency response management application. As discussed above, another type of SUPL location-based service may include a location finder application on a SET that requests location from a SUPL instantiation on the SET. Such a location finder application may represent a SUPL Agent.

In some implementations, a SUPL Agent may reside on a network and may transmit a location request to an H-SLP to locate a particular SET. Such an H-SLP may initiate a SUPL session to estimate a location of a particular SET and may subsequently transmit the estimated location to a requesting SUPL Agent on a network. For example, an application server in the network may request a location of a particular individual. Such an application server may transmit a request to an H-SLP to obtain the individual's location, e.g., the location of a SET associated with the individual. Such an application server may have a web interface and another person may log on to the application server to inquire about the individual's location. If the individual's SET is located, the location of the SET may be displayed on a map showing the individual's location, for example.

In one or more implementations, a SET may communicate with other wireless devices and/or may acquire wireless measurements or other information. In an outdoor environment, for example, a SET may estimate its own location. In one particular implementation, a SET may estimate its location based at least in part on navigation signals received from a Satellite Positioning System (SPS), such as Global Positioning System (GPS) or Galileo by, for example, correlating pseudorange measurements from several (e.g., four or more) transmitters.

However, a SET may be utilized within an area where navigation signals from an SPS are not available, such as, for example, within certain indoor environments such as buildings, sports stadiums, parking structures, or shopping malls, to name just a few among many examples of indoor environments. In one or more implementations, a SET may determine information relating to its location. In one implementation, a SET may determine an initial location estimate based at least in part on location information received via wireless signals transmitted from wireless network elements or other devices capable of wirelessly transmitting signals. Such location information may comprise information received from one or more wireless devices to identify or estimate a location of a mobile device within an environment. For example, location information may comprise a measured signal strength of a wireless signal or a measured length of time for a wireless signal transmitted by a wireless device to be received by a SET, where either measurement may be utilized to estimate a range to a wireless device. Location information may also comprise identification information, such as a Machine Addressable Content Identifier (MAC ID) of a wireless device, for example.

Wireless network elements, such as wireless local area network (WLAN) access points, may be located throughout an area at known locations and a SET may estimate ranges from the SET to particular wireless network elements (e.g., by measuring received signal strength or round-trip delay, as discussed above). Such ranges may be estimated, and a location of such a SET may be triangulated using known techniques.

In some implementations, an H-SLP may locate SETs that are located in an outdoor environment, but may not, however, have an ability to locate SETs located in an indoor environment. For example, in some indoor environments, SPS signals may not be available and as discussed above, a location of a SET may instead be estimated based at least in part on communications with various wireless devices such as access points or wireless base stations within or accessible to the SET within the indoor environment. A SET may, for example, estimate its location with respect to a local coordinate system, such as by estimating that it is 10.0 meters away from a first access point, 9.6 meters away from a second access point, and 5.7 meters away from a third access point in one example. However, in some indoor environments, locations of such access points or wireless base stations may not be known and a SET may therefore be unable to estimate its location.

In one or more implementations, information relating to a location of a mobile device may be determined based at least in part on one or more signals received by the mobile device. Such a mobile device may transmit information relating to a location of the mobile device to one or more network elements, such as an H-SLP. Such a mobile device may receive, from one or more network elements, information relating to indoor context information for an indoor environment based at least in part on information relating to the location of the mobile device. An estimate of a location of such a mobile device may be obtained or otherwise determined based at least in part on information relating to the location of the mobile device and information relating to indoor context information. Such a mobile device as described above may comprise a SET.

In one or more implementations, a network element, such as an H-SLP may determine or otherwise obtain a location estimate for a mobile device, such as a SET. For example, a network element may receive a signal transmitted by a mobile device. Such a signal may comprise information relating to a location of such a mobile device within an indoor environment. Such a network element may determine or otherwise locate or obtain information relating to indoor context information for an indoor environment based at least in part on such information relating to a location of such a mobile device. A location of such a mobile device may be determined or otherwise obtained based at least in part on such information relating to a location of the mobile device and information relating to indoor context information. One or more location-based services may subsequently be performed, such as subsequently locating a mobile device, based at least in part on the location of the mobile device.

Figure 1:
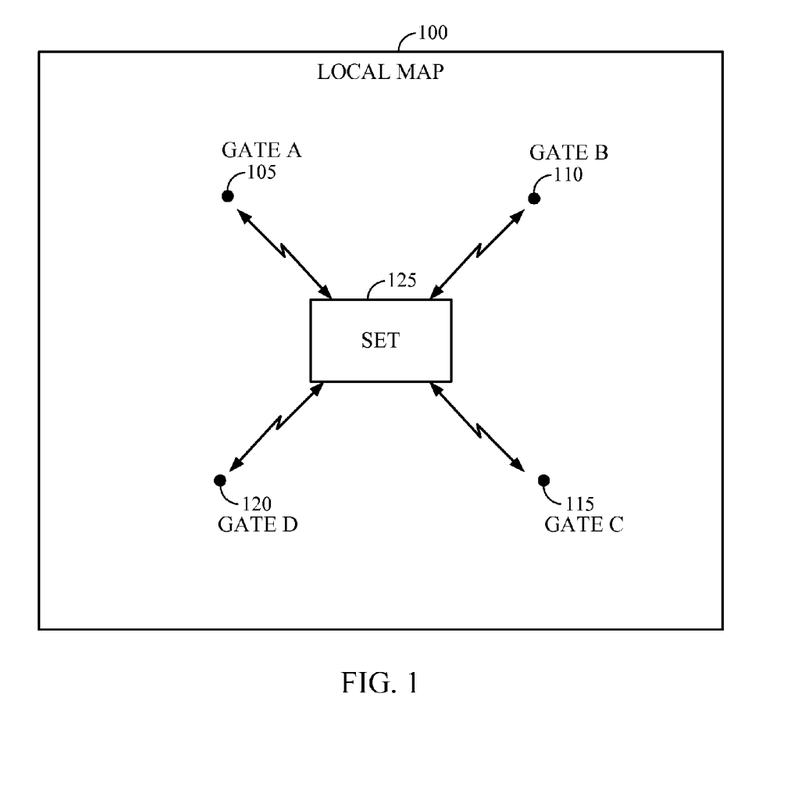
FIG. 1 illustrates a section of a local map according to one or more implementations.

FIG. 1 illustrates a section of a local map 100 according to one or more implementations. Local map 100 may depict an airport terminal, for example. There are several gates shown on local map 100, including Gate A 105, Gate B 110, Gate C 115, and Gate D 120. Respective access points, wireless base stations, or other wireless devices may be located at Gates A 105, B 110, C 115, and D 120. A SET 125 may communicate with at least three of such wireless devices and may triangulate its location based at least in part on such communications. If there is at least one anchor point located somewhere on local map 100 for which both local and global coordinates are known, an estimated location for SET 125 may be determined with respect to global coordinates, for example.

Various points on local map 100 may be associated with a Cartesian grid or some other grid having or associated with at least two-dimensional coordinates. For example, various points on local map 100 may be associated with x,y coordinates on a Cartesian grid. In one implementation, if local coordinates have been estimated for SET 125, a difference in terms of such local x,y coordinates between an estimated location of the SET 125 and local coordinates for an anchor point, such as Gate A 105, in this example, may be determined. Such a difference in terms of local coordinates may subsequently be utilized with respect to global coordinates for Gate A to estimate a location of SET 125 with respect to global coordinates. In other words, a difference in terms of local coordinates may be correlated with respect to global coordinate system based at least in part on an anchor point.

A SET may acquire location information, such as measurements from one or more wireless devices. Such measurements may include, for example, receive signal strength (RSSI) of a signal transmitted from a wireless device and received at the SET. If a location of such a wireless device is known, a range from the SET to the wireless device may be estimated as a function of the RSSI. Another type of measurement that may be acquired by a SET is a measurement of travel time for a wireless signal to travel from a wireless device to a SET. For example, a SET may transmit a probe request signal requesting a response and, upon receipt, a wireless device may transmit an acknowledgement response signal. Based at least in part on a time interval between a SET transmitting a probe request signal and receiving an acknowledgement response signal, a range from a SET to a wireless device may be measured. In some implementations, a processing delay measured at a wireless device between receipt of a probe request signal and transmission of an acknowledgement response signal may be subtracted from a measured time interval. In some implementations, a wireless device may transmit a beacon at known time intervals and a range between the wireless device and a SET may be estimated based at least in part on a time difference between a time at which the beacon was transmitted and a time at which the beacon was received by the SET.

In one or more implementations, an H-SLP or another network element may transmit information relating to indoor context information to a SET to assist the SET in estimating its location and/or receiving measurements from one or more wireless devices. "Indoor context information," as used herein may refer to information characterizing an indoor environment and enabling a SET to estimate its location. For example, indoor context information may comprise locations, such as local and/or global locations or coordinates, of known access points or other wireless network elements within an indoor environment. Indoor context information may aid or otherwise enable a mobile device, such as a SET, in communication with one or more wireless devices in an indoor environment to estimate a location of the mobile device. In one or more implementations, an H-SLP may transmit indoor context information or a link to the indoor context information to a SET.

In some implementations, a SET may make measurements based at least in part on received signals. Such measurements may relate to quality of received signal, such as signal strength, or timing of a received signal, such as a time interval at which a signal is received relative to a time at which the signal was transmitted, for example. Such signals signal may comprise a radio signal from an access point or a cellular cell/sector which a SET may use (e.g., with assistance from an H-SLP) to determine its initial location. Such signals may be transmitted wirelessly or via one or more wired connections. An initial location of a SET may be estimated based at least in part on measurements determined from one or more received signals.

Indoor context information may also comprise an identifier (ID) or name of an indoor location, such as a particular terminal within an airport or a floor of a building, for example. Indoor context information may include one or more indoor maps corresponding to an indoor environment and/or a base station almanac, such as a Wi-Fi base station almanac, to identify various wireless base stations within an indoor environment or exact locations of such wireless base stations. Indoor context information may also include a link, such as a uniform resource locator (URL), of a server capable of transmitting indoor maps or other indoor information.

Indoor context information may further indicate anchor points from which to determine relative location, for example, to convert between local and global coordinates. One example of an anchor point may include information to associate Gate 20C at Terminal 1 of an airport with x,y latitude and longitude coordinates. Indoor context information may further include an identity of an indoor location that may be determined from a last known global coordinate or an extended cell identifier (E-CID) for a particular wireless base station. For example, a Wi-Fi access point may be deployed at an airport and if a SET receives a signal from the Wi-Fi access point, the SET may determine that it is located at the airport.

Another example of indoor context information comprises information indicating which forms of enhanced indoor location estimation or positioning support are available. For example, indoor context information may include hints to indicate whether a SET may rely on assisted global position system (A-GPS), E-CID, Wi-Fi, or Bluetooth or other wireless technologies, for example, to estimate its location within a particular indoor environment.

In some implementations, there may be different environments for which local context information is available. For example, local context information for hundreds of different airports, shopping malls, or other locales may be available. To estimate a location of a SET in a time and resource efficient manner, an appropriate locale in which a SET is located may initially be identified and then local context information for the locale may be acquired.

In one or more implementations, two location estimates may be determined for a SET. An initial location estimate may comprise a rough or course location estimate. A "rough location estimate," as used herein may refer to a location estimate for which an accuracy of the location estimate is relatively low. For example, if a location estimate is based on a cell/sector identifier of a received cellular base station and a radius of the base station is known as 2.0 miles, then the location estimate has a relatively low accuracy because the SET could be anywhere within the 2.0 mile radius of the radio cell. If, on the other hand, a location estimate is calculated using GPS, the accuracy of the location estimate may be 10.0 meters. It may be difficult to determine with any degree of certainty whether a SET is within a 5,000 meter range of an airport unless the airport has the shape of a circle and a base station of a cell/sector which was used to determine a rough location estimate is in the center of that circle.

A SET may communicate with an H-SLP to receive location assistance. For example, a SET may transmit a signal to an associated H-SLP and may receive an acknowledgement from the H-SLP. An authentication process may be undertaken to establish a connection between the SET and the H-SLP. After authentication, a SET may request the H-SLP server to provide location assistance for the SET to determine its own rough location estimate. For example, a SET may transmit an id of a radio cell on which it was communicating to an H-SLP and the H-SLP may, in turn, determine and then transmit location assistance such as a latitude/longitude estimate and an estimated accuracy.

In some implementations, a SET may also communicate with a local SLP to receive a rough location estimate or location assistance. For example, a local SUPL Location Platform (SLP) may have an ability to more quickly calculate and transmit a rough location estimate or location assistance for a SET than an H-SLP for the SET would be able to do. In one or more implementations, for example, a SET may be carried into an area by an individual and a local SLP may be automatically discovered by the SET. For example, upon entering an environment, a SET may identify or otherwise locate a local SLP associated with the environment and may attempt to establish a connection to the local SLP. In some implementations, there may be network elements, such as access points, broadcasting an address or location of a local SLP and upon receipt of such an address, a SET may transmit a signal to the local SLP. Upon receipt of the signal by the local SLP, the local SLP may transmit an acknowledgement to the SET and may undergo an authentication process to establish a connection with the SET. After a connection has been established between a SET and a local SLP, a rough location estimate or other location assistance may be transmitted by the local SLP to the SET.

A SET may communicate with an Access Network SLP (A-SLP) in some implementations. An A-SLP may comprise an SLP, but an A-SLP may not have a relationship with a particular SET user who has a H-SLP based on a subscription of a user of the SET. An A-SLP may be discovered by a SET on the fly and therefore does not have a preconfigured "home" relationship such as the SET has with an H-SLP.

If a rough location estimate for a SET has been determined, the SET may transmit a message to an H-SLP or a local SLP requesting specific indoor context information associated with the rough location estimate. In response to such a request, an H-SLP or a local SLP may transmit the relevant indoor context information to the SET. The SET may thereafter utilize the indoor context information to estimate its location with respect to a coordinate system, such as a global coordinate system, with precision. For example, a SET may utilize both information relating to a rough location estimate and information relating to indoor context information to estimate its location.

Accordingly, as discussed above, two location estimates may therefore be determined for a SET. A rough location estimate may initially be determined and the rough location estimate may be utilized as a data key or reference to determine associated indoor context information to utilize to estimate a location of the SET with respect to a coordinate system with precision.

Upon receipt of indoor context information, a SET may acquire location information such as measurements or other information from wireless devices. A SET or an H-SLP, for example, may utilize such indoor context information and information relating to a location of the SET, for example, to estimate local coordinates and/or global coordinates for the SET.

In some implementations, a SET may estimate its own location based at least in part on measurements or other information received from wireless devices within an indoor environment. If a SET has estimated its location, the SET may transmit its location estimate to an H-SLP, for example. Such an H-SLP may thereafter store location estimates of one or more SETs within an indoor environment.

In some implementations, a SET may acquire measurements or other information from wireless devices within an indoor environment and transmit such measurements to an H-SLP. Such an H-SLP may estimate a location of such a SET based at least in part on measurements received from the SET.

In some implementations, a service discovery process may be utilized to identify indoor context information to send to a SET. For example, upon entering an indoor environment, a server may discover a SET. For example, a SET may attempt to log onto a Wi-Fi network for an indoor environment, and a network device may transmit a message to an H-SLP server to notify the H-SLP of the SET's presence within a particular indoor environment. Such an H-SLP may, for example, transmit indoor context information or a link to the indoor context information to the SET. Accordingly, during such a service discovery process, indoor context information may effectively be "pushed" to a SET without the SET transmitting a message to an H-SLP specifically requesting the indoor context information.

In some implementations, a SET may log onto a network via a wired connection. For example, a SET may connect to a local area network (LAN) via an Ethernet cable or some other wired connection. In some implementations, a network device on a LAN may transmit a message to an H-SLP requesting that indoor context information be transmitted to a SET.

In some implementations, upon logging onto a Wi-Fi network a SET may be informed by the Wi-Fi network that indoor context information is available at a certain link, such as a Uniform Resource Location (URL). Informing a SET of a link for indoor context information is analogous to informing a laptop that there is a local printer on a network when signing onto the network, for example. Upon being informed of a link to indoor context information, a SET may contact an H-SLP and ask whether the link is authorized.

In some implementations, an H-SLP may transmit indoor context information directly and/or indirectly to a SET. For example, an H-SLP may directly transmit indoor context information by including such indoor context information within a message transmitted to a SET. An H-SLP may indirectly transmit indoor context information by including a link or address within a message transmitted to a SET and the SET may thereafter acquire the indoor context information from the link or address. An H-SLP may transmit such information to a SET via a wired or wireless connection.

Figure 2:
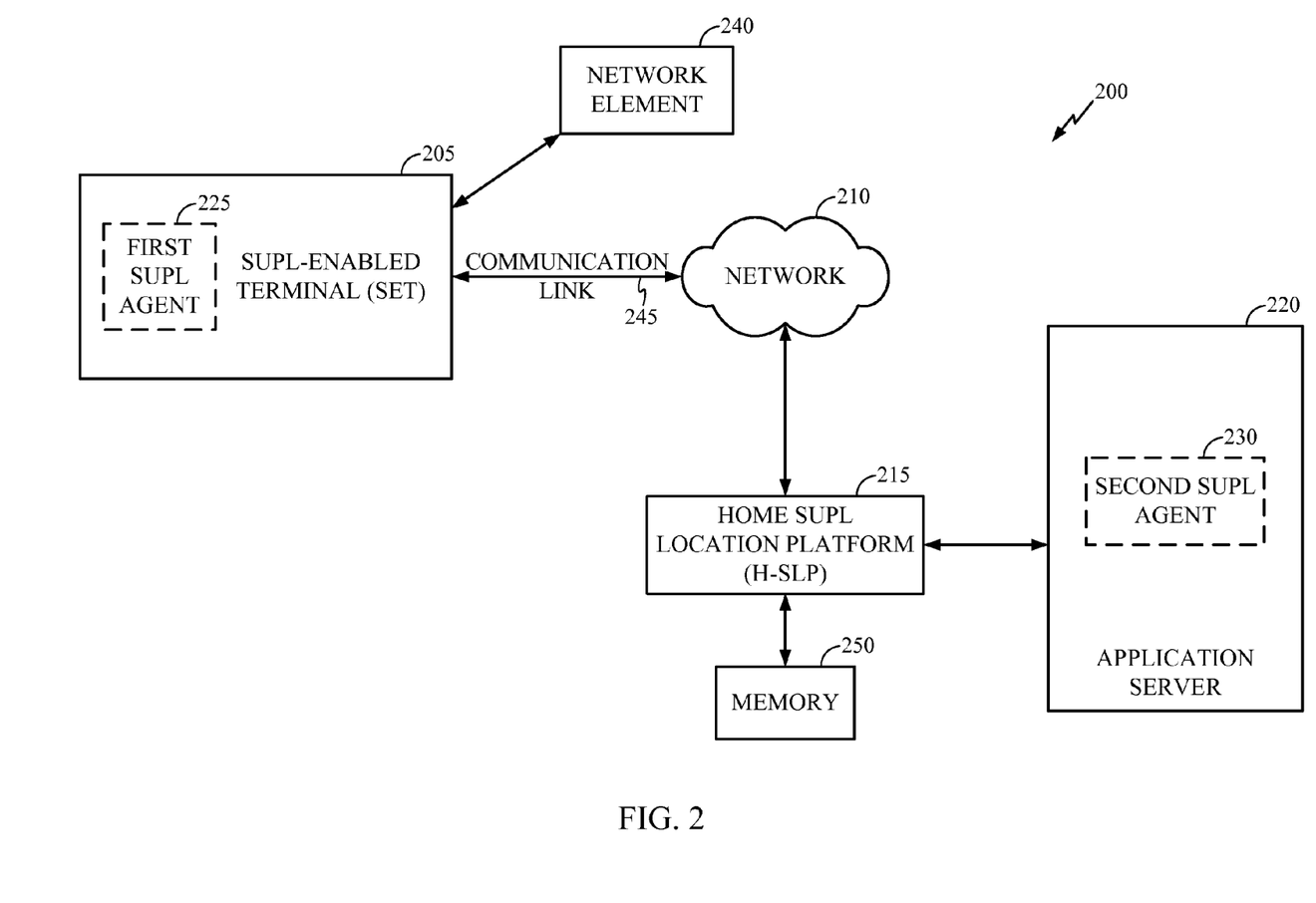
FIG. 2 is a schematic block diagram of a system for supporting location estimation of a target SET using an exchange of SUPL information according to one implementation.

FIG. 2 is a schematic block diagram of a system 200 for supporting location estimation of a target SET 205 using an exchange of SUPL information according to one implementation. System 200 may include various entities such as SET 205, a network 210, an H-SLP 215, and an application server 220 or other computing platform.

SET 205 may communicate with H-SLP 215 via network 210. For example, SET 205 may transmit one or more messages to H-SLP 215 requesting indoor context information. Messages may be transmitted via one or more signals. Upon receipt of such message(s), H-SLP 215 may transmit a message in response that includes requested indoor context information and/or a link or address from where the indoor context information may be acquired. For example, H-SLP 215 may provide a Uniform Resource Locator (URL) or MAC ID of a location from which indoor context information may be acquired. For example, a link may indicate that indoor context information may be acquired from a network element 240. In one of more implementations, SET 205 may transmit a message requesting indoor context information from network element 240 and network element 240 may respond by transmitting the indoor context information via a message.

In one or more implementations, a SET 205 may transmit to H-SLP 215 information relating to a location of the SET 205 and the H-SLP 215 may identify indoor context information relating to an indoor environment corresponding to the information relating to the location of the SET 205. A SET may use a previously calculated location fix to determine whether it has entered an indoor area. If a SET attempts to obtain a GPS fix but cannot receive any SPS signals, the SET may look into its position cache, if there is one, to determine whether it has a recently calculated its location or position (e.g., within the past five minutes). If a SET does find a suitable location or position fix, the SET may use this information to request indoor context information related to that location. H-SLP 215 may determine indoor context information corresponding to such an estimate of a location for the SET 205 and may transmit the indoor context information or a link to the indoor context information to SET 205.

In some implementations, SET 205 may receive signals from one or more wireless devices, such as access points, for example, with an indoor environment. Based at least in part on such signals, SET 205 may determine a rough estimate of its location or may transmit measurements or other information relating to such signals to H-SLP 215.

In one or more implementations, SET 205 may measure an RSSI of signals received from other wireless devices and/or a length of a time interval for a wireless signal to travel from a wireless device to the SET 205. One or more signals transmitted by a wireless device may include certain identifying information, such as a MAC ID of the wireless device.

A communication link 245 between SET 205 and network 210 may be wired or wireless. For example, SET 205 may wirelessly transmit one or more messages to H-SLP 215 via network 210. In some implementations, SET 205 may connect to network 210 via a wired connection, such as via an Ethernet or Digital Subscriber Line cable, for example.

As discussed above, in some implementations, a service discovery process may be implemented whereby SET 205 need not request indoor context information from H-SLP 215. Instead, such indoor context information may be pushed or transmitted to SET 205 without the SET 205 specifically requesting such indoor context information. For example, if SET 205 connects to network 210, a network element may transmit a message to H-SLP 215 to inform the H-SLP 215 of the presence of SET 205. H-SLP 215 may thereafter transmit a message to SET 205 containing relevant indoor context information or a link to the indoor context information.

SET 205 may include a first SUPL Agent 225. First SUPL Agent 225 may comprise an application program executed by SET 205 which an individual may utilize to post his or her current location. For example, as discussed above, an individual's SET 205 may execute an application program that allows various individuals connected through a network, such as the Internet, to post updates such as their respective current locations. First SUPL Agent 225 may generate a location request and transmit the location request to an internal Application Programming Interface (API) of the SET 205. An API on SET 205 may translate a location request to initiate a SUPL session to estimate its location. If a location of SET 205 is estimated via a SUPL session, the location estimate may be translated by an API and transmitted back to the first SUPL Agent 225.

Accordingly, in this example, first SUPL Agent 225 is terminal-based because it resides on SET 205. In some implementations, first SUPL Agent 225 may be separate from SET 205 but may instead be in communication, such as direct communication, with SET 205.

In some implementations, application server 220 may include a second SUPL Agent 230. Second SUPL Agent 230 may request locations for various SETs capable of being located by H-SLP 215. In this example, second SUPL Agent 230 is network-based because it is separate from any SET capable of being located by H-SLP 215.

For example, in the event that a user transporting SET 205 is lost or experiences a medical emergency, first SUPL Agent 225 may desire to determine the location of SET 205. First SUPL agent 225 and/or second SUPL agent 230 may, for example, comprise an application program executed by a remote computer, computing device, or computing platform. First SUPL agent 225 and/or second SUPL agent 230 may transmit location requests and/or otherwise communicate with H-SLP 215 via network 210, other networks, or a direct connection in some implementations.

Network 210 may comprise a wireless network or may instead comprise a hard-wired or partially hard-wired network. Moreover, in some implementations, an Emergency SUPL Location Platform (E-SLP) may be utilized instead of, or in addition to, an H-SLP 215. An E-SLP may determine a location of a SET 205 in an emergency situation, such as for locating a SET 205 in association with an emergency E911 call.

Communication may be initiated between H-SLP 215 and SET 205 by either H-SLP 215 or SET 205. To initiate the communication, in one implementation H-SLP 215 may transmit an SUPL initiation message (e.g., SUPL INIT) to SET 205, or SET 205 may transmit an SUPL initiation message (e.g., SUPL START) to H-SLP 215. To continue the SUPL session, in some implementations, the recipient, if it is the SET 205, may establish a secure Internet Protocol (IP) connection to an H-SLP 215 and then return a SUPL message.

H-SLP 215 may access a memory 250 in which indoor context information and/or identities of links to stored locations of the indoor context information may be stored. For example, information which may be useful to aid SET 205 in estimating its location may be transmitted to SET 205. As discussed above, according to some implementations, indoor context information may be transmitted in response to receipt of a request from a SET for such indoor context information.

Figure 3:
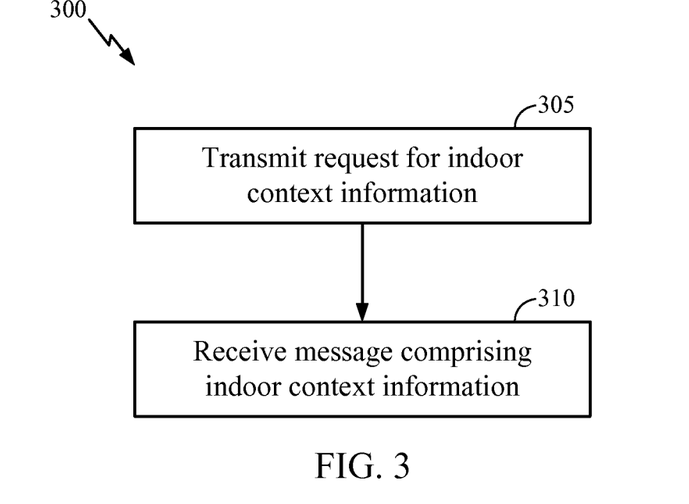
FIG. 3 is a flow diagram of a process for requesting indoor context information according to one or more implementations.

FIG. 3 is a flow diagram of a process 300 for requesting indoor context information according to one or more implementations. First, at operation 305, a mobile device, such as a SET, may transmit a request for indoor context information to an H-SLP. In one example, a SET may receive signals from one or more access points or wireless base stations with an indoor environment. For example, an access point or wireless base station may periodically broadcast such signals. Alternatively, a SET may transmit a probe request and an access point or wireless base station may receive the probe request and transmit an acknowledgement signal in response. A signal transmitted from a wireless base station or access point to a mobile device may include information to identify the wireless base station or access point such as, for example, a MAC-ID or other identifier. Referring back to operation 305, a SET may include a MAC-ID or other identifier for a wireless base station or access point in a request for indoor context information. An H-SLP, for example, may receive such a request and may identify a particular indoor environment based at least in part on such a MAC-ID or other identifier. For example, an H-SLP may access a look-up table which indicates which MAC-IDs or other identifiers are associated with which indoor environments. If an indoor environment is identified, an H-SLP may transmit a message to be received by a SET at operation 310. Such a signal may include indoor context information or a link to the indoor context information.

Figure 4:
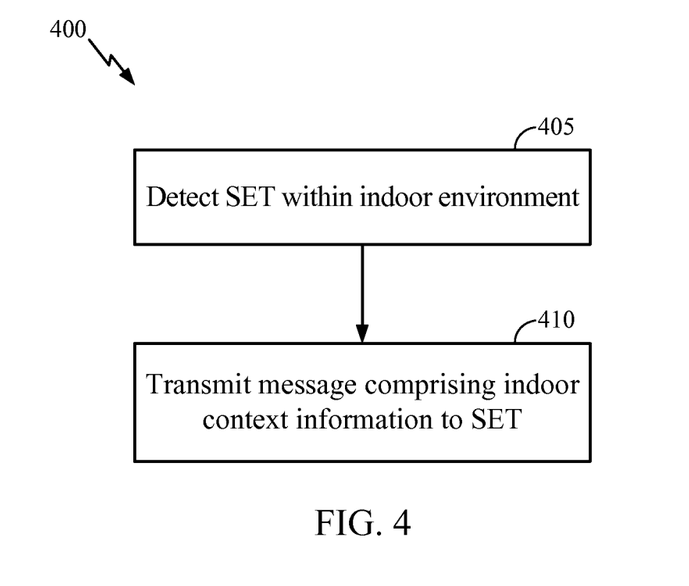
FIG. 4 is a flow diagram of a process for transmitting information relating to indoor context information to a SET in response to discovering the SET according to one or more implementations.

FIG. 4 is a flow diagram of a process 400 for transmitting information relating to indoor context information to a SET in response to discovering the SET according to one or more implementations. First, a mobile device, such as a SET, may be detected within an indoor environment at operation 405. For example, a service discovery operation may detect a presence of SET. In one implementation, a SET may connect to a network and a network element may transmit a message to an H-SLP to indicate a presence of the SET. If a SET has been detected, a message comprising indoor context information or a link to the indoor context information may be transmitted from an H-SLP to the SET at operation 410.

Figure 5:
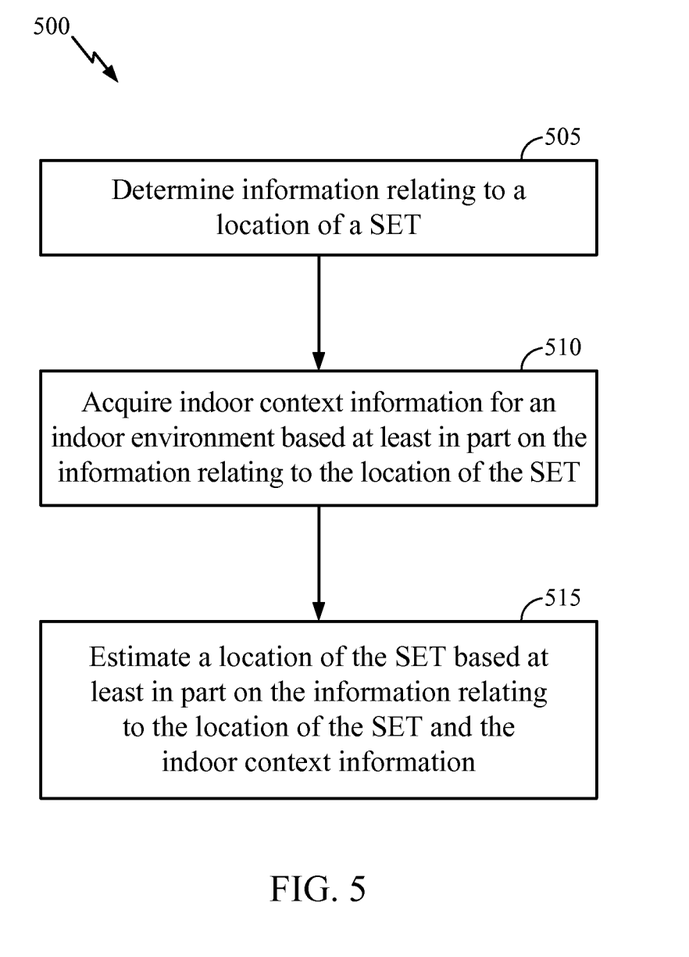
FIG. 5 is a flow diagram of a process for estimating a location of a SET according to one or more implementations.

FIG. 5 is a flow diagram of a process 500 for estimating a location of a mobile device, such as a SET, according to one or more implementations. Process 500 may be implemented by a SET to estimate a location of the SET. First, at operation 405, information relating to a location of a SET may be determined. For example, a rough location estimate may be determined based at least in part on communications with one or more access points within an indoor environment. As discussed above, the rough location estimate may indicate a general area or range of coordinates at which the SET is located. The rough location estimate may be determined based on signals transmitted between the mobile device and a SUPL server or other network element, for example. As discussed above, a SET may measure RSSI or a time interval for a wireless signal to travel from a wireless device to the SET. A wireless signal may also include certain identifying information such as a MAC ID, for example, to identify a particular access point, wireless base station, or other wireless device.

Alternatively, a SET may estimate its location based at least in part on SPS signals prior to entering an indoor environment. In some implementations, a SET may connect to a LAN and an identity of the LAN may be determined.

Next, at operation 510, indoor context information may be acquired by a SET based at least in part on information relating to a location of the SET determined at operation 505. In one or more implementations, indoor context information may be acquired at operation 510, by a SET transmitting information relating to the location of the SET to one or more network elements, and in response the SET may receive information relating to indoor context information for an indoor environment from the one or more network elements based at least in part on the information relating to the location of the mobile device.

At operation 515, a location of a SET may be estimated based at least in part on the information relating to the location of the SET and the indoor context information. As discussed above, indoor context information or a link to the indoor context information may be transmitted by an H-SLP in response to a request from a SET in some implementations. The indoor context information may be determined or selected based at least in part on the information relating to the location for the SET. An estimated location of such the SET may be transmitted to one or more network elements, such as an H-SLP or some other location server, for example.

Figure 6:
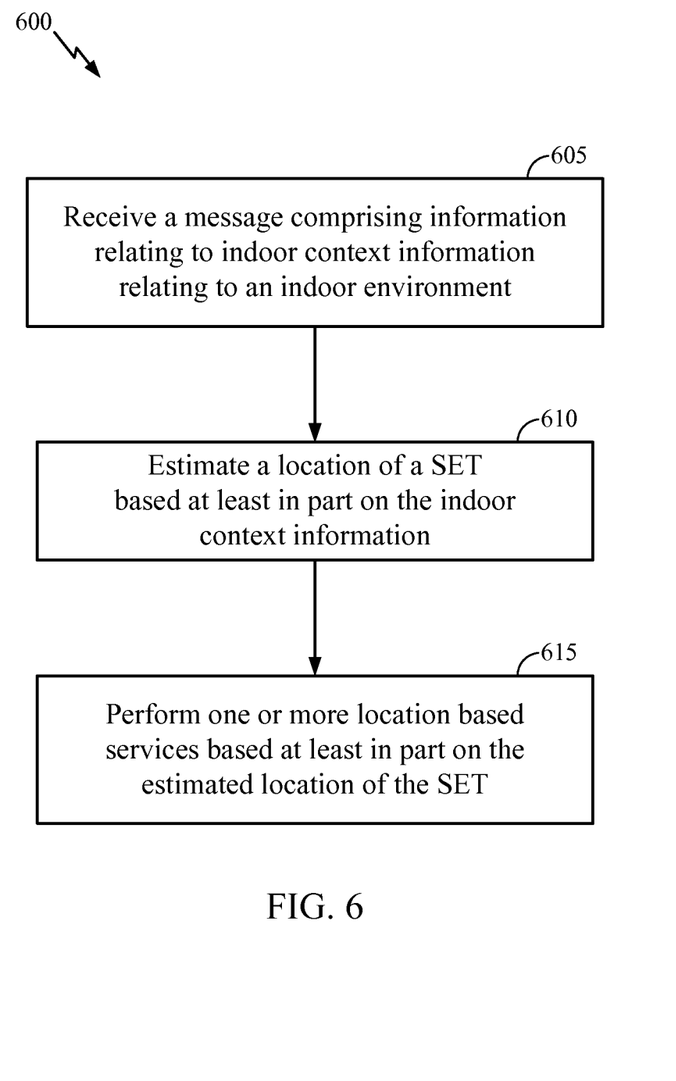
FIG. 6 is a flow diagram of a process for estimating a location of a SET according to one or more implementations.

FIG. 6 is a flow diagram of a process 600 for estimating a location of a mobile device, such as a SET, according to one or more implementations. Process 600 may be implemented by a network element to estimate a location of a SET. First, at operation 605, a message may be received that includes information relating to indoor context information relating to an indoor environment. For example, such information may be received from an H-SLP or from other network entities such as a Domain Name System (DNS) or Dynamic Host Configuration Protocol (DHCP) server. Such information may include indoor context information and/or a link to the indoor context information. A network element may comprise an H-SLP or some other location server, for example.

In one or more implementations, for example, an individual may carry a SET into an indoor environment, such as an airport terminal. The SET may attach to a data network within such an airport terminal via a wired or wireless connection. After such a SET has attached to a data network, a network element may point transmit indoor context information to the SET or may instead transmit context information indicated a location from which the indoor context information may be obtained, such as a network address.

In one or more implementations, security measures may be implemented by a SET. For example, a SET may include a list of approved entities from which information relating to indoor context information may be received. For example, if indoor context information or a link to the indoor context information is received from an approved or otherwise known network element, then a SET may utilize the indoor context information or may retrieve the indoor context information. On the other hand, if indoor context information or a link to the indoor context information is received from network element that is not approved or otherwise known, a SET may ignore the received indoor context information or the link to the indoor context information. Alternatively, if indoor context information or a link to the indoor context information is received by a SET from a network element, the SET may contact an H-SLP to determine whether the network element is on an approved or otherwise known list.

A location of a SET may be estimated based at least in part on indoor context information and information relating to a location of the SET at operation 610. For example, information may be utilized to determine a range from the SET to one or more access points and the indoor context information may include geographical coordinates for one of the access points or for some other anchor point. Accordingly, a combination of both information relating to a location and indoor context information may be utilized to estimate a location of a SET. Finally, at operation 615, one or more location-based services may be performed based at least in part on an estimated location of such a SET.

As discussed above, an H-SLP or some other network element may transmit indoor context information to a SET. In some implementations, one or more SETs or other mobile devices may transmit indoor context information to an H-SLP or other network elements. For example, an individual may enter an area and a wireless device unaffiliated with an H-SLP may transmit an electronic map of the area or a link to the electronic map, to the individual's SET. Upon receipt, the SET may transmit or upload the electronic map to an H-SLP or some other network element for storage. An H-SLP or another network element may thereafter transmit the uploaded electronic map to other SETs, for example.

Other types of indoor context information may also be uploaded by a SET. For example, a SET may detect locations of one or more access points or may receive information about the access points via a wireless signal transmitted by another peer SET. Upon receipt of such indoor context information relating to access points, the SET may upload the indoor context information to an H-SLP or some other network element.

Figure 7:
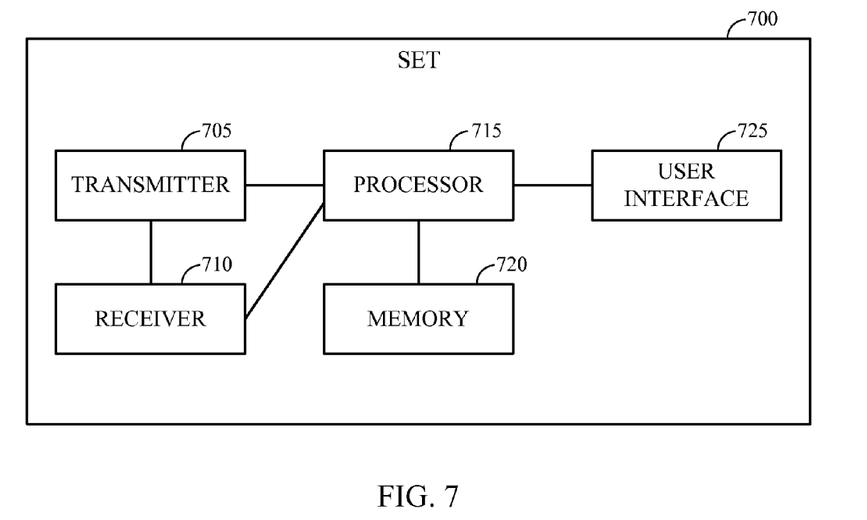
FIG. 7 is a schematic block diagram of a SET according to one or more implementations.

FIG. 7 is a schematic block diagram of a mobile device, such as a SET 700, according to one or more implementations. SET 700 may comprise a mobile device capable of implementing a SUPL protocol, for example. SET 700 may include a transmitter 705, receiver 710, processor 715, memory 720, and user interface 725, for example. Transmitter 705 may transmit wireless signals to one or more wireless devices within an indoor environment or to an H-SLP or some other server, such as a location server, for example. Receiver 710 may receive wireless signals from one or more wireless devices within an indoor environment and may receive indoor context information transmitted from an H-SLP or a location server, for example. In one or more implementations, for example, a transceiver may be utilized instead of, or in addition to, transmitter 705 and receiver 710.

Processor 715 may process information and may determine location information based at least in part on wireless signals received from wireless devices within an indoor environment. For example, processor 715 may estimate a range from a wireless device based at least in part on an RSSI of a received signal and/or a time delay between transmission of such a signal from the wireless device and receipt by receiver 710 of SET 700. Processor 715 may also process a received signal to determine whether additional identifying information, such as a MAC ID of a wireless device, is included in the received signal.

Memory 720 may store measurements and/or other information received from wireless devices. Memory 720 may also store program code executable by processor 715. User interface 725 may include one or more output devices, such as a display or speaker. User interface 725 may also include one or more user input devices, such as a touch screen, keyboard, touchpad, or any other device capable of receiving an input from a user.

Figure 8:
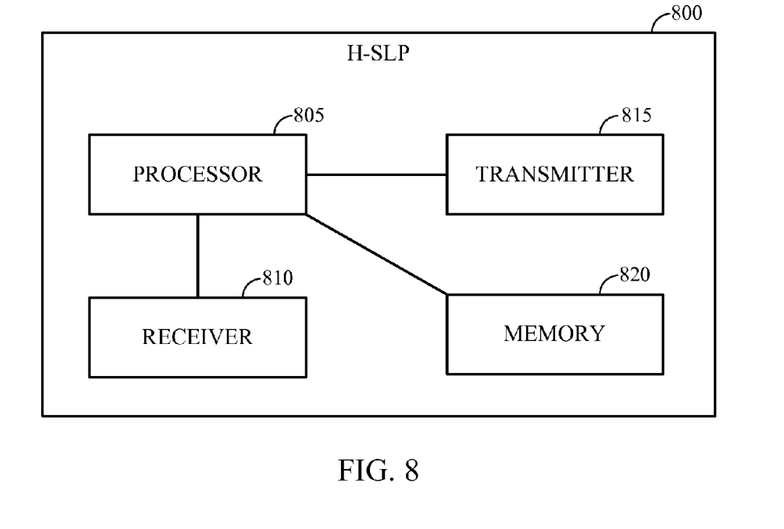
FIG. 8 is a schematic block diagram of a Home SUPL Location Platform (H-SLP) according to one or more implementations.

FIG. 8 is a schematic block diagram of an H-SLP 800 according to one or more implementations. As shown, H-SLP 800 may include a processor 805, receiver 810, transmitter 815, and memory 820, for example. Receiver 810 may receive signals from a SUPL Agent and/or a mobile device, such as a SET. For example, receiver 805 may receive a signal comprising indoor context information to be transmitted to a mobile device via transmitter 815. For example, processor 805 may send a control signal to transmitter 815 to initiate transmission of indoor context information to a mobile device. Receiver 810 may also receive a location estimate or certain wireless measurements or other information from a mobile device in some implementations.

In some implementations, a mobile device may transmit a request for indoor context information to H-SLP 800. H-SLP 800 may transmit such a request to a SUPL Agent and may receive such indoor context information from the SUPL Agent via receiver 810.

Memory 820 may comprise a storage medium and may store program code or machine-readable instructions executable by processor 805. Memory 820 may also store indoor context information in some implementations.

Some portions of the detailed description above are presented in terms of algorithms or symbolic representations of operations on binary digital signals stored within a memory of a specific apparatus or special purpose apparatus or computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the above discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. For example, a specific computing apparatus may comprise one or more processors programmed with instructions to perform one or more specific functions.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or hardware/software implementations, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile station and/or an access point and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in hardware/software, functions that implement methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
  determining information relating to a location of a mobile device based at least in part on one or more signals received by the mobile device;
  transmitting, from the mobile device, the information relating to the location of the mobile device to one or more first network elements;
  receiving from one or more second network elements, at the mobile device, indoor context information for an indoor environment based at least in part on the information relating to the location of the mobile device, wherein the indoor context information includes information identifying a position of each of one or more first wireless access points within the indoor environment;
  receiving information identifying a position of each of one or more second wireless access points not included with the indoor context information from an entity related to the indoor environment or a second mobile device;
  sending from the mobile device the information identifying the position of the each of the one or more second wireless access points to the one or more second network elements;
  receiving, at the mobile device, updated indoor context information from the one or more second network elements; and obtaining an estimate of the location of the mobile device based at least in part on the information relating to the location of the mobile device and the updated indoor context information.

2. The method of claim 1 wherein the updated indoor context information includes position information for at least one of the one or more second wireless access points.

3. The method of claim 1 wherein the information identifying the position of the each of the one or more second wireless access points not included with the indoor context information comprises map information for the indoor environment comprising the position of the each of the one or more second wireless access points in the indoor environment.

4. The method of claim 1 wherein the information identifying the position of the each of the one or more second wireless access points not included with the indoor context information comprises a link to map information for the indoor environment.

5. The method of claim 1 wherein the entity related to the in the indoor environment is a server associated with the indoor environment.

6. An apparatus, comprising:
a processor configured to determine information relating to a location of a mobile device based at least in part on one or more signals received by the mobile device;
memory;
a transmitter configured to send the information relating to the location of the mobile device to one or more first network elements;
a receiver configured to:
receive, from one or more second network elements, indoor context information for an indoor environment based at least in part on the information relating to the location of the mobile device, wherein the indoor context information includes information identifying a position of each of one or more first wireless access points within the indoor environment; and
receive information identifying a position of each of one or more second wireless access points not included with the indoor context information from an entity related to the indoor environment or a second mobile device;
the transmitter being further configured to send the information identifying the position of the each of the one or more second wireless access points to the one or more second network elements;
the receiver being further configured to receive updated indoor context information from the one or more second network elements; and
the processor being further configured to obtain an estimate of the location of the mobile device based at least in part on the information relating to the location of the mobile device and the updated indoor context information.

7. The apparatus of claim 6 wherein the updated indoor context information includes position information for at least one of the one or more second wireless access points.

8. The apparatus of claim 6 wherein the information identifying the position of each of the one or more second wireless access points not included with the indoor context information comprises map information for the indoor environment comprising the position of the each of the one or more second wireless access points in the indoor environment.

9. The apparatus of claim 6 wherein the information identifying the position of the each of the one or more second wireless access points not included with the indoor context information comprises a link to map information for the indoor environment.

10. The apparatus of claim 6 wherein the entity related to the in the indoor environment is a server associated with the indoor environment.

11. An apparatus comprising:
means for determining information relating to a location of a mobile device based at least in part on one or more signals received by the mobile device;
means for transmitting the information relating to the location of the mobile device to one or more first network elements;
means for receiving from one or more second network elements indoor context information for an indoor environment based at least in part on the information relating to the location of the mobile device, wherein the indoor context information includes information identifying a position of each of one or more first wireless access points within the indoor environment;
means for receiving information identifying a position of each of one or more second wireless access points not included with the indoor context information from an entity related to the indoor environment or a second mobile device;
means for sending the information identifying the position of the each of the one or more second wireless access points to the one or more second network elements;
means for receiving updated indoor context information from the one or more second network elements; and
means for obtaining an estimate of the location of the mobile device based at least in part on the information relating to the location of the mobile device and the updated indoor context information.

12. The apparatus of claim 11 wherein the updated indoor context information includes position information for at least one of the one or more second wireless access points.

13. The apparatus of claim 11 wherein the information identifying the position of the each of the one or more second wireless access points not included with the indoor context information comprises map information for the indoor environment comprising the position of the each of the one or more second wireless access points in the indoor environment.

14. The apparatus of claim 11 wherein the information identifying the position of the each of the one or more second wireless access points not included with the indoor context information comprises a link to map information for the indoor environment.

15. The apparatus of claim 11 wherein the entity related to the in the indoor environment is a server associated with the indoor environment.

16. A non-transitory computer-readable medium, having stored thereon computer-readable instructions configured to cause a computer to:
determine information relating to a location of a mobile device based at least in part on one or more signals received by the mobile device;
transmit the information relating to the location of the mobile device to one or more first network elements;
receive from one or more second network elements indoor context information for an indoor environment based at least in part on the information relating to the location of the mobile device, wherein the indoor context information includes information identifying a position of each of one or more first wireless access points within the indoor environment;

receive information identifying a position of each of one or more second wireless access points not included with the indoor context information from an entity related to the indoor environment or a second mobile device;

send the information identifying the position of the each of the one or more second wireless access points to the one or more second network elements;

receive updated indoor context information from the one or more second network elements; and obtain an estimate of the location of the mobile device based at least in part on the information relating to the location of the mobile device and the updated indoor context information.

17. The non-transitory computer-readable medium of claim 16 wherein the updated indoor context information includes position information for at least one of the one or more second wireless access points.

18. The non-transitory computer-readable medium of claim 16 wherein the information identifying the position of the each of the one or more second wireless access points not included with the indoor context information comprises map information for the indoor environment comprising the position of the each of the one or more second wireless access points in the indoor environment.

19. The non-transitory computer-readable medium of claim 16 wherein the information identifying the position of the each of the one or more second wireless access points not included with the indoor context information comprises a link to map information for the indoor environment.

20. The non-transitory computer-readable medium of claim 16 wherein the entity related to the in the indoor environment is a server associated with the indoor environment.

21. A method comprising:
receiving, at a network element, information relating to a location of a mobile device within an indoor environment;

determining, at the network element, information relating to indoor context information for the indoor environment based at least in part on the information relating to the location of the mobile device, wherein the information relating to the indoor context information includes information identifying a position of each of one or more first wireless access points within the indoor environment;

receiving, at the network element, from the mobile device, information associated with a position of each of one or more second wireless access points not included with the indoor context information;

generating updated indoor context information by updating the information relating to the indoor context information to include the position of the each of the one or more second wireless access points; and sending the updated indoor context information to the mobile device from the network element.

22. The method of claim 21 wherein the updated indoor context information includes position information for at least one of the one or more second wireless access points.

23. The method of claim 21 wherein the information identifying the position of the each of the one or more second wireless access points not included with the indoor context information comprises map information for the indoor environment comprising the position of the one or more second wireless access points in the indoor environment.

24. The method of claim 21 wherein the information identifying the position of the each of the one or more second wireless access points not included with the indoor context information comprises a link to map information for the indoor environment.

25. An apparatus, comprising:
a processor configured to determine information relating to a location of a mobile device based at least in part on one or more signals received by the mobile device;

memory;

a transmitter configured to send the information relating to the location of the mobile device to one or more first network elements; and a receiver configured to receive information relating to the location of the mobile device within an indoor environment;

the processor being further configured to determine information relating to indoor context information for the indoor environment based at least in part on the information relating to the location of the mobile device, wherein the information relating to the indoor context information includes information identifying a position of each of one or more first wireless access points within the indoor environment;

the receiver being further configured to receive, from the mobile device, information associated with a position of each of one or more second wireless access points not included with the indoor context information;

the processor being further configured to generate updated indoor context information by updating the information relating to the indoor context information to include the position of the each of the one or more second wireless access points; and the transmitter being further configured to send the updated indoor context information to the mobile device.

26. The apparatus of claim 25 wherein the updated indoor context information includes position information for at least one of the one or more second wireless access points.

27. The apparatus of claim 25 wherein the information identifying the position of the each of the one or more second wireless access points not included with the indoor context information comprises map information for the indoor environment comprising the position of the one or more second wireless access points in the indoor environment.

28. The apparatus of claim 25 wherein the information identifying the position of the each of the one or more second wireless access points not included with the indoor context information comprises a link to map information for the indoor environment.

29. An apparatus comprising:
means for receiving information relating to a location of a mobile device within an indoor environment;

means for determining information relating to indoor context information for the indoor environment based at least in part on the information relating to the location of the mobile device, wherein the information relating to the indoor context information includes information identifying a position of each of one or more first wireless access points within the indoor environment;

means for receiving, from the mobile device, information associated with a position of each of one or more second wireless access points not included with the indoor context information;

means for generating updated indoor context information by updating the information relating to the indoor context information to include the position of the each of the one or more second wireless access points; and means for sending the updated indoor context information to the mobile device.

30. The apparatus of claim 29 wherein the updated indoor context information includes position information for at least one of the one or more second wireless access points.

31. The apparatus of claim 29 wherein the information identifying the position of the each of the one or more second wireless access points not included with the indoor context information comprises map information for the indoor environment comprising the position of the one or more second wireless access points in the indoor environment.

32. The apparatus of claim 29 wherein the information identifying the position of the each of the one or more second wireless access points not included with the indoor context information comprises a link to map information for the indoor environment.

33. A non-transitory computer-readable medium, having stored thereon computer-readable instructions configured to cause a computer to:
  receive information relating to a location of a mobile device within an indoor environment;
  determine information relating to indoor context information for the indoor environment based at least in part on the information relating to the location of the mobile device, wherein the information relating to the indoor context information includes information identifying a position of each of one or more first wireless access points within the indoor environment;
  receive, from the mobile device, information associated with a position of each of one or more second wireless access points not included with the indoor context information;
  generate updated indoor context information by updating the information relating to the indoor context information to include the position of the each of the one or more second wireless access points; and
  send the updated indoor context information to the mobile device.

34. The non-transitory computer-readable medium of claim 33 wherein the updated indoor context information includes position information for at least one of the one or more second wireless access points.

35. The non-transitory computer-readable medium of claim 33 wherein the information identifying the position of the each of the one or more second wireless access points not included with the indoor context information comprises map information for the indoor environment comprising the position of the one or more second wireless access points in the indoor environment.

36. The non-transitory computer-readable medium of claim 33 wherein the information identifying the position of the each of the one or more second wireless access points not included with the indoor context information comprises a link to map information for the indoor environment.

* * * * *